(12) United States Patent
Roach et al.

(10) Patent No.: US 9,174,719 B1
(45) Date of Patent: Nov. 3, 2015

(54) TENDON ROUTING AT ENVELOPE APEX (71) Applicant: Google Inc., Mountain View, CA (US)

(72) Inventors: Kevin Roach, Boulder Creek, CA (US); Daniel Henry Fourie, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/703,045

(22) Filed: May 4, 2015

Related U.S. Application Data (63) Continuation of application No. 14/270,518, filed on May 6, 2014, now Pat. No. 9,027,874.

(51) Int. Cl.
*B64B 1/40* (2006.01)
*B64B 1/58* (2006.01)
*B64B 1/42* (2006.01)

(52) U.S. Cl.
CPC .... *B64B 1/58* (2013.01); *B64B 1/42* (2013.01)

(58) Field of Classification Search
CPC .............. B64B 1/42; B64B 1/50; B64B 1/52; B64B 1/54; B64B 1/58; B64B 1/62; B64B 1/66; B64B 1/04
See application file for complete search history.

(56) References Cited

U.S. PATENT DOCUMENTS

| | | | |
|---|---|---|---|
| 1,270,678 A * | 6/1918 | Zavarkin | 244/98 |
| 1,733,732 A | 10/1929 | Henvis | |
| 2,679,224 A * | 5/1954 | Sturtevant | 114/54 |
| 2,858,090 A | 10/1958 | Winzen | |
| 2,919,082 A | 12/1959 | Winzen et al. | |
| 2,960,282 A | 11/1960 | Winzen | |
| 3,311,328 A | 3/1967 | Slater | |
| 3,534,927 A | 10/1970 | Harding | |
| 3,616,569 A | 11/1971 | Litt | |
| 4,113,206 A | 9/1978 | Wheeler | |
| 4,117,993 A | 10/1978 | Palm et al. | |
| 4,390,149 A | 6/1983 | Barnes et al. | |
| 4,434,958 A | 3/1984 | Rougeron et al. | |
| 4,529,153 A | 7/1985 | Conn | |
| 4,750,690 A | 6/1988 | Conn | |
| 6,655,206 B1 | 12/2003 | Barat | |
| 7,469,857 B2 | 12/2008 | Voss | |

(Continued)

OTHER PUBLICATIONS

X. Deng. "Clefted Equilibrium Shapes of Superpressure Balloon Structures." California Institute of Technology, Pasadena, California. © 2012, 158 pages. Retrieved from: <http://thesis.library.caltech.edu/7141/>.

(Continued)

*Primary Examiner* — Brian M O'Hara
(74) *Attorney, Agent, or Firm* — Lerner, David, Littenberg, Krumholz & Mentlik, LLP (57) ABSTRACT

A top cap assembly is provided for mounting tendon to a balloon that has a balloon envelope. The assembly includes a plate structure having a plurality of junction portions disposed at an apex of the balloon envelope and a plurality of tendon pairs. Each tendon pair includes first and second tendon members attached to the balloon envelope. The first tendon member is arranged to cross over the plate structure. The second tendon member is arranged to engage the first length tendon member at a given one of the junction portions of the doubler plate. A fastener member is attached to each tendon pair of the plurality of tendon pairs. The fastener member is used for securing the first and second tendon members of a given tendon pair together in order to support lift gas carried by the balloon envelope.

20 Claims, 8 Drawing Sheets

(56) References Cited

U.S. PATENT DOCUMENTS

| | | |
|---|---|---|
| 7,611,395 B2 | 11/2009 | Bonsembiante |
| 8,303,367 B2 | 11/2012 | English |
| 2003/0062444 A1 | 4/2003 | Goodey |
| 2012/0031119 A1 | 2/2012 | Ahmad et al. |
| 2014/0360660 A1 | 12/2014 | Latham et al. |

OTHER PUBLICATIONS

A. L. Morris. "Scientific Ballooning Handbook." NCAR Technical Note. Atmospheric Technology Division, National Center for Atmospheric Research. May 1975, 258 pages.

* cited by examiner

TENDON ROUTING AT ENVELOPE APEX

CROSS-REFERENCE TO RELATED APPLICATIONS

The present application is a continuation, of U.S. patent application Ser. No. 14/270,518, filed May 6, 2014, the disclosure of which is incorporated herein by reference.

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. As such, the balloons include a flexible envelope made of material that may be configured in sections or lobes to create a "pumpkin" or lobed balloon. These lobes are supported by a plurality of tendons.

The tendons are used to help maintain the shape and carry the load of the pressurized envelope so that the envelope material does not bear as much while the balloon is in flight. In some situations, a heavy metal load ring or rod can be attached to the tendons to support the anticipated tendon load caused by inflating the balloon envelope. For example, the metal load ring may be fastened to the tendons through pre-fixed cut outs in an apparatus, which may be used to transfer the load of one tendon to its opposite on the other side of the apex through hoop stress in the load ring.

BRIEF SUMMARY

Aspects of the disclosure provide an assembly. In one embodiment, the assembly includes a plate structure disposed at an apex of a balloon envelope and a plurality of tendon pairs. Each tendon pair includes first and second tendon members attached to the balloon envelope. The first tendon member is arranged to cross over the plate structure and the second tendon member is arranged to engage the first length tendon member at the plate structure. A fastener member is associated with each tendon pair of the plurality of tendon pairs. The fastener member is used for securing the first and second tendon members of a given pair of the plurality of tendon pairs together in order to support the balloon envelope.

In one example, the plate structure is configured to rest on a central portion of the apex. In some aspects, the first tendon member for a given tendon pair is longer across the plate structure than the second tendon member of the given tendon pair.

In some examples, the assembly further includes a spacer portion arranged on the plate structure. The spacer portion is arranged to help avoid stacking of the tendons at the apex in order to reduce friction between each tendon pair of the plurality of tendon pair. This spacer portion is secured to at a central section of the plate structure and additionally helps the top cap assembly to be more deterministic.

In other examples, the plate structure further includes a plurality of junction portions. Each junction portion indicates a location on the plate structure for a given pair of first and second tendon members of the plurality of tendon pairs to be joined. The junction portions are arranged along a circumference of the plate structure. They are configured to keep the tendon pairs of the plurality of tendons spaced apart by a uniform distance. In this regard, the assembly includes one or more clips attached to the plate structure at each junction portion. Each clip is configured to receive a portion of a given tendon pair of the plurality of tendon pairs joined at that junction portion. The one or more clips are further configured to hold the given tendon pair to the plate structure.

In another embodiment, a system is provided. The system includes a balloon having a balloon envelope and a top cap assembly for mounting tendons to the balloon. The top cap assembly includes a plate structure disposed at an apex of the balloon envelope and a plurality of tendon pairs. Each tendon pair includes first and second tendon members attached to the balloon envelope. The first tendon member is arranged to cross over the plate structure and the second tendon member is arranged to engage the first length tendon member at the plate structure. A fastener member is used for securing the first and second tendon members of a given pair of the plurality of tendon pairs together in order to support the balloon envelope.

DETAILED DESCRIPTION

The present disclosure generally relates to providing techniques for mounting tendons to a balloon that has a balloon envelope. One aspect provides a top cap assembly that includes a doubler plate structure resting on top of the balloon envelope rather than being adhered to the balloon. In some examples, the doubler plate may be of lightweight materials, while having a surface thickness that is slightly thicker than the material of the balloon envelope. This doubler plate may include a number of junction portions indicating a position on the plate where tendon pairs of the balloon meet and are joined to each other. Alternatively, the "doubler plate" can be a "doubler film" that forms a cap of the envelope at the top and bottom of the balloon, such as end caps on a beach ball. In this example, the junction points or tendon retainers can be sealed to the doubler film.

After the doubler plate/film has been arranged on the top of the balloon envelope, a plurality of tendon pairs are laid or otherwise stretched over the doubler plate. Each tendon pair includes a long length tendon member and a short length tendon member attached to the balloon envelope. The long length tendon member is arranged to cross over the doubler plate so as to engage the short length tendon member at a given junction portion on the plate. A fastener may be attached to each tendon member pair. The fasteners are used to secure the long and short length tendon members together in order to support a load of lift gas carried by the balloon envelope.

In some embodiments, the top cap assembly may also include a spacer portion coupled to the doubler plate. The spacer portion is used to stack up the pairs of long and short length tendon members fastened together so as to reduce friction between each pair. In this regard, the spacer portion can be used to keep things generally neater and more deterministic at the apex of the balloon. In some embodiments, a center of the spacer can be hollow to allow for access to the balloon envelope at the apex, for example, as a fill port for lift gas.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents.

Figure 1:
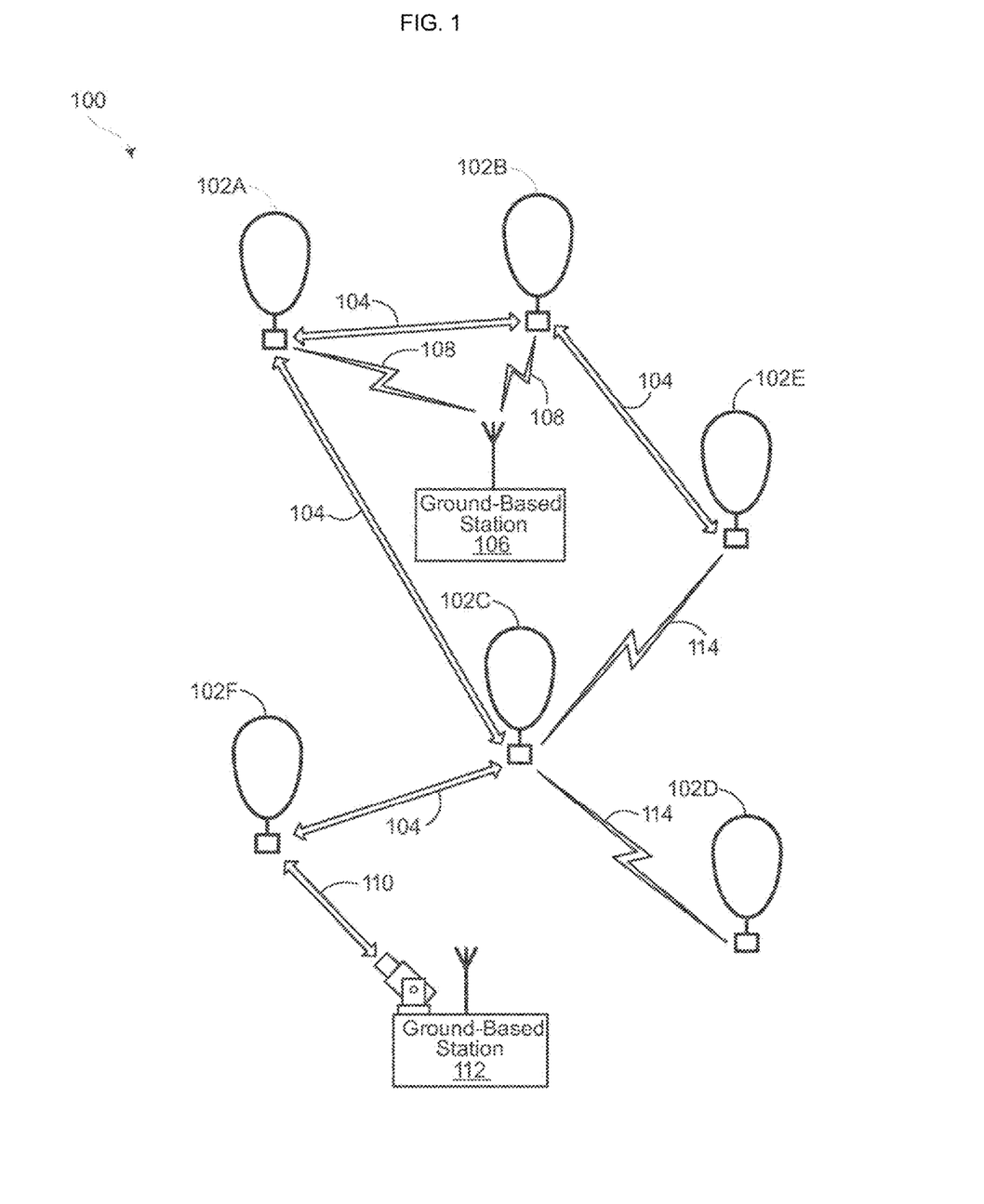
FIG. 1 is a functional diagram of a system in accordance with aspects of the present disclosure.

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." The balloon network 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Figure 2:
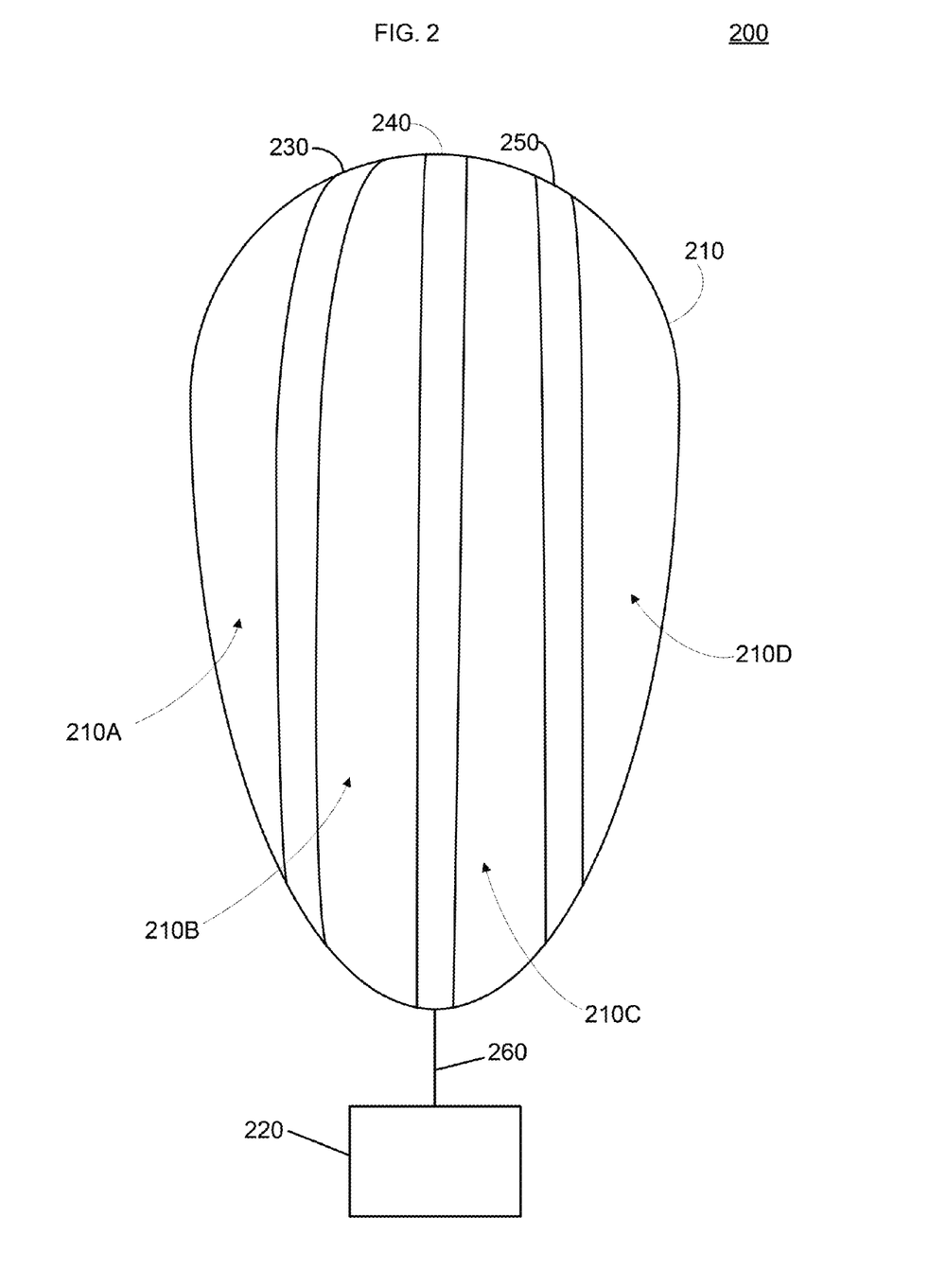
FIG. 2 is an example of a balloon in accordance with aspects of the present disclosure.

FIG. 2 is an example balloon 200, which may represent any of the balloons of balloon network 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 is affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be include a plurality of envelope lobes or gores of a thin film material, such as polyethylene or polyethylene terephthalate, which is lightweight, yet has suitable strength properties for use as a balloon envelope deployable in the stratosphere. In this example, balloon envelope 210 is comprised of envelope gores 210A-210D.

Pressurized lift gas within the balloon envelope 210 may cause a force or load to be applied to the balloon 200. As previously noted, the balloon envelope 210 may be constructed from lightweight materials such as polyethylene that may not be able to support the weight of a given load that is carried while the balloon 200 is floating in the air. As an example, this load may include the lift gas carried by the balloon envelope 210, the payload 220 attached to the balloon 200 and etc. Accordingly, additional support may be required to carry the load and to maintain the shape of the balloon envelope 210 when the envelope experiences internal pressure relative to the atmosphere. The tendons 230-250 provide strength to the balloon 200 to carrier the load created by the pressurized gas within the balloon envelope 210.

Each tendon may be formed as a fiber load tape that is adhered to a respective envelope gore. Alternately, a tubular sleeve may be adhered to the respective envelopes with the tendon positioned within the tubular sleeve. In some examples, the tendons 230-250 may be run from the apex to the bottom of the balloon envelope 210 in order to pick up the load. In normal operations, these tendons 230-250 need to be kept in place during balloon flight in order to continue to handle the load and maintain the shape of the balloon envelope. Top ends of the tendons 230, 240 and 250 may be coupled together using a type of apparatus or top cap (not shown) positioned at the apex of balloon envelope 210. Examples of such top caps are further discussed below.

As noted above, one aspect of the present technology provides a lightweight assembly for mounting tendons to a balloon structure. In this regard, the assembly serves as a type of top cap resting on an area at the top of a balloon envelope. The techniques disclosed herein seek to route tendons over and across the assembly in order to attach each tendon to a given tendon on an opposite side of the apparatus. An advantage of the assembly is that it may allow the tendons to support the balloon without the need of a heavy support system for the tendons.

Figure 3:
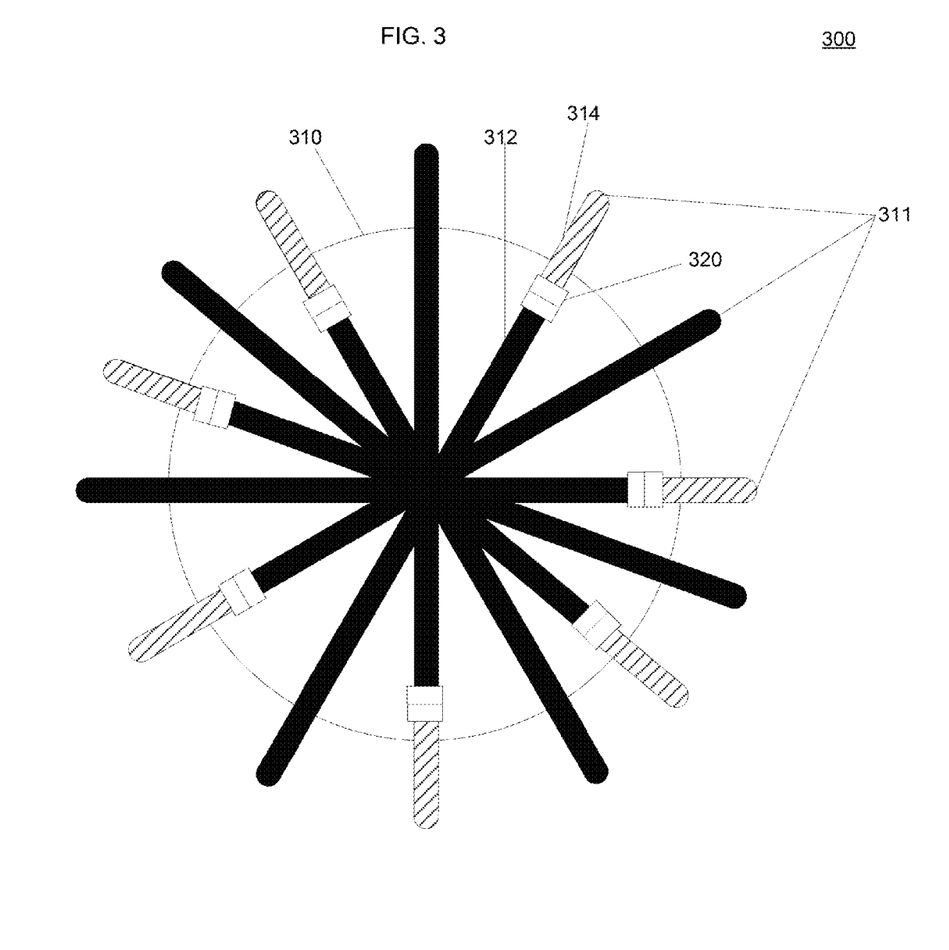
FIG. 3 is an example of a top cap assembly in accordance with aspects of the present disclosure.

One example of a top cap assembly 300 is shown in FIG. 3. In this example, the top cap assembly 300 includes a doubler plate structure 310 positionable on a balloon envelope (not shown), a plurality of tendon pairs 311 crossing over the plate 310, and a number of fastener members, such as fastener 320. Each tendon pair of the plurality of tendon pairs 311 includes a first tendon member 312 and a second tendon member 314. For example, as shown in FIG. 3, the first tendon member 312 is all black, while the second tendon member 314 is depicted with stripes. In some aspects, the fastener members may be used to secure the first and second tendon members of a given tendon pair together.

Doubler plate structure 310 can be constructed from several types of lightweight yet rigid materials, such as plastics, PVC, metals and etc. In other embodiments, the doubler plate structure 310 may be a doubler film that is constructed of the same or similar material as the balloon envelope. For example, the doubler film may of a film material, such as polyethylene or polyethylene terephthalate. In this regard, the doubler film may be an integral part of the balloon envelope. In some embodiments, the doubler plate 310 or doubler film may have a thickness sufficient enough to support the plurality of tendon pairs 311 without substantially losing its shape. For example, in one embodiment, the plate 310 may have a predetermined thickness of suitable material, e.g., approximately 4 mil polyethylene (PE).

In some examples, the thickness of the doubler plate 310 may be uniformly distributed along all areas of its surface. Alternatively, the doubler plate 310 may have a different thickness in certain portions. For example, reinforcements, such as extra plate material, may be added to portions of the doubler plate 310 to increase the thickness of the plate in that area. The reinforcements may be used to add extra strength to those areas of the doubler plate 310 so that it can better hold its shape when forces are applied due to a weight of the lift gas load carried by the plurality of tendon pairs 311.

Each tendon pair of the plurality of tendon pairs 311 includes a first and second tendon member, such as tendon members 312, 314. In some examples, these tendon members are individually attached to the balloon envelope. As discussed above, the tendon members 312, 314 may be fastened to a respective gore of the balloon envelope, for example, by inserting the pairs through a type of sleeve (not shown) sewed to the envelope.

In some aspects, the first and second tendon members may be of different lengths. For example, as shown in FIG. 3, the first tendon member 312 can be of a predetermined length sufficiently long enough to cross over the doubler plate 310. While the second tendon member 314 may not be as long as the first tendon member 312, it is of a sufficient length to engage member 312 at the doubler plate 310. When the two tendon members are engaged at the doubler plate 310, portions of the members may be then secured to each other.

To secure the portions of the tendon pairs together, several techniques can be employed. In some embodiments, fastener member 320 can be used. For example, the fastener member 320 may include a device that can be configured to receive end portions of the first and second tendon members 312, 314. Once the fastener member 320 receives the end portions, they may be held tightly within a body of the fastener member 320, for example, by using mechanical clamps. In some embodiments, the end portions of the tendons may terminate in wedge-shaped fittings. These wedge shape fittings may be slotted into a matching wedge-shaped fastener member that can hold the tendons in tension.

In further examples, other techniques may be employed that can secure the two tendon members together with enough strength to hold during the balloon flight. In other embodiments, the fastener member 320 can include fastening component, such as bar tacks, hooks, threaded and non-threaded components, loops at the ends of the tendons fastened by pins, etc. These fastening components may be attached to respective joining portions at an end of each of the first and second tendon members 312, 314 as discussed above. The components may be configured to mate with each other at the respective joining portions so that when mated a strong and secure connection is created between the tendon members.

Figure 4:
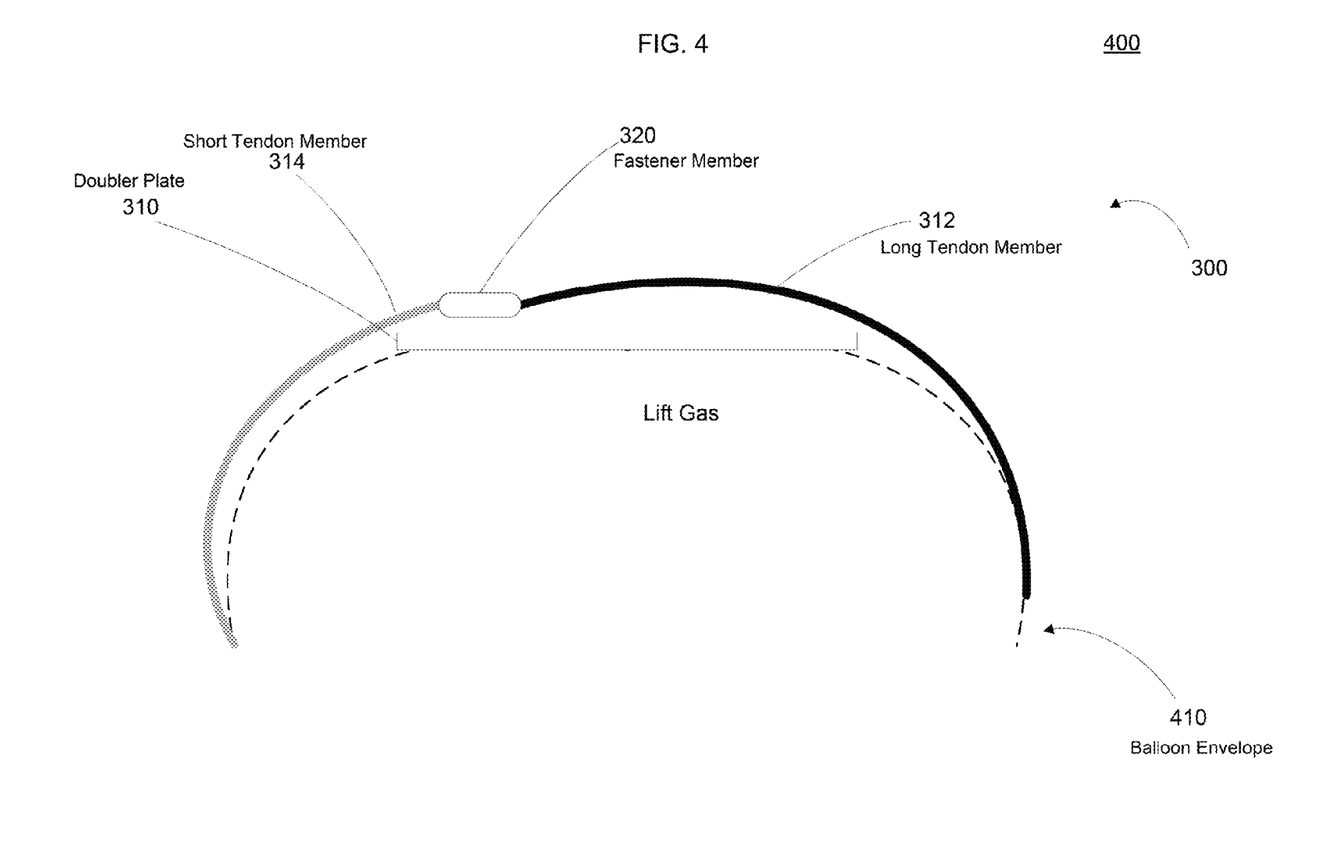
FIG. 4 is a cross-sectional view of the top cap assembly of FIG. 3 in accordance with aspects of the present disclosure.

In FIG. 4, a cross-sectional view 400 of the top cap assembly 300 of FIG. 3 is shown. To assemble components of the top cap assembly 300, the doubler plate 310 may be first placed on top of balloon envelope 410. As noted above, in some embodiments, the plate 310 may be a doubler film that is an integral part of the balloon envelope 410 at the top of the balloon. In this example, the doubler plate 310 may be arranged so that it rests substantially near a central portion of the top area of the envelope 410. This is so that the plate 310 can better keep balance while resting at the apex. Additionally, by arranging the plate 310 to rest near center, it allows for a more uniform distribution of the tendons over the balloon envelope 410.

Each of the tendon pairs are fastened together after the doubler plate 310 is positioned on the apex. For example, a long length tendon from a given tendon pair, such a long tendon member 312, is laid over and across the plate 310 so that it can reach a corresponding short length tendon member 314 on the other side of the envelope 410. As discussed above, once the tendon members engage they may be secured together using fastener member 320. These steps of crossing individual tendon pairs across the doubler plate 310 and fastening them together is repeated over and over until the entirety of the plurality of tendon pairs have been secured across the doubler plate 310.

Figure 5:
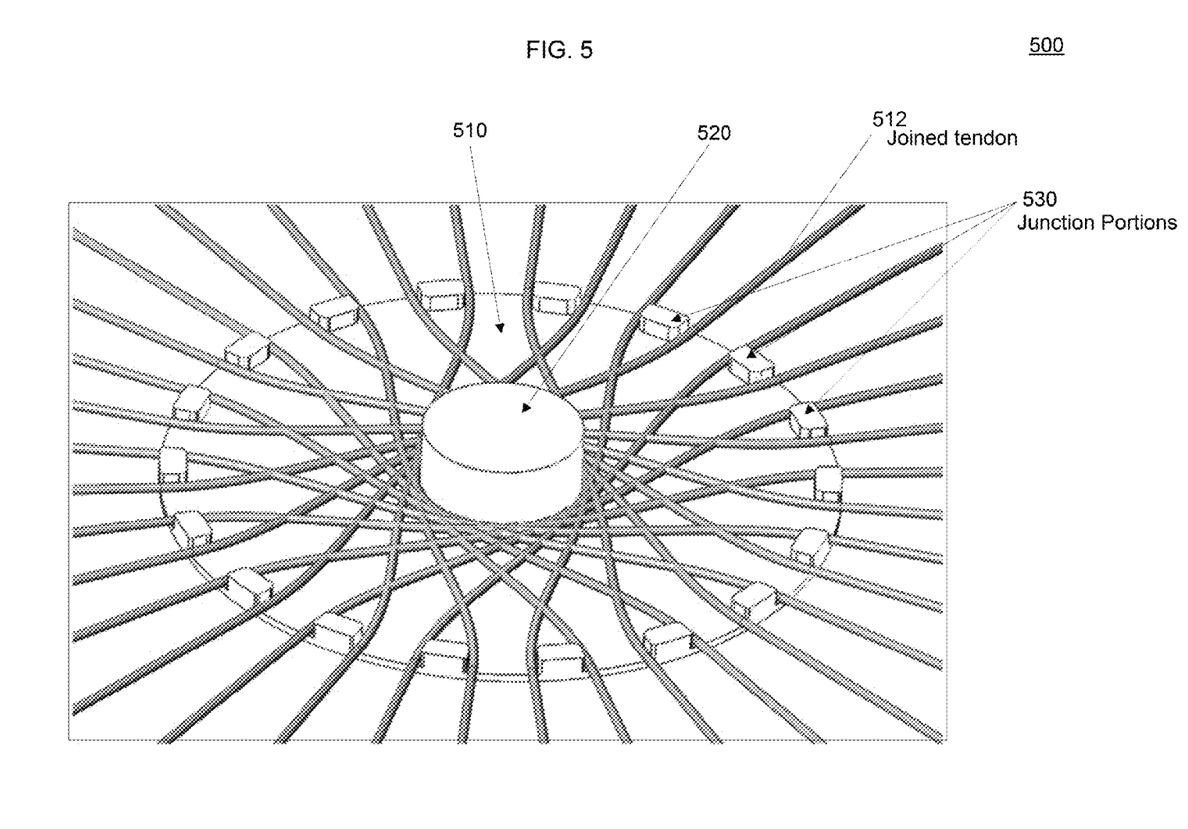
FIG. 5 is another example of a top cap assembly in accordance with aspects of the present disclosure.

FIG. 5 is another example of a top cap assembly 500. In this example, an entire network of joined tendon pairs, such as joined tendon pair 512 are shown assembled over the top cap assembly 500. This example top cap assembly 500 is configured similarly to top cap assembly 300 of FIG. 3. For example, the top cap assembly 500 includes a doubler plate 510 and a plurality of joined tendon pairs having first and second tendon members joined via fastener members (not shown), such as the fasteners 320 described above. Here, the top cap assembly 500 also includes a spacer portion 520 and a number of junction portions 530 disposed on a surface of the plate 510. As shown, the junction portions 540 are arranged along a circumference of the plate 510. Each junction portion indicates a location on the plate 510 where the first and second tendon members of a given tendon pair can meet in order to be joined together by the fasteners members.

Spacer portion 520 may be constructed of the same material as the doubler plate 510. For example, the spacer portion 520 may be constructed from several types of lightweight yet rigid materials, e.g., plastics, PVC, metal and etc. While the spacer portion 520 may be of the same material as the doubler plate 510, the spacer portion can alternatively be of a different material than the plate. In some embodiments, the spacer portion 520 can be constructed from any suitable material with similar or different strength properties than the doubler plate 510. For instance, these suitable materials of the spacer portion 520 are capable of being attached to a surface of the doubler plate 510 and can withstand air pressure and different temperature extremes at a high altitude.

As shown in FIG. 5, the spacer portion 520 may be a circular or other shaped protrusion arranged at a central section of the doubler plate 510. An advantage of arranging the spacer portion 520 at the central section of the plate is that this arrangement may allow for a more uniform distribution of joined tendon pairs 512 over the plate. In this example, the spacer portion 520 projects vertically from the surface of the doubler plate 510. In doing so, this may allow the spacer to be arranged so as assist in stopping the joined tendon pairs from stacking up in the central portion of the plate. For example, the spacer portion 520 may be arranged so that the joined tendon pairs 512 are guided around the central portion of the plate 510 instead of crossing over each other. This may help reduce rubbing or an amount of friction between different joined tendon pair which may decrease an amount of wear and tear on the tendon pairs 512, and thus increase the useful life of the tendons during the balloon flight.

Figure 6:
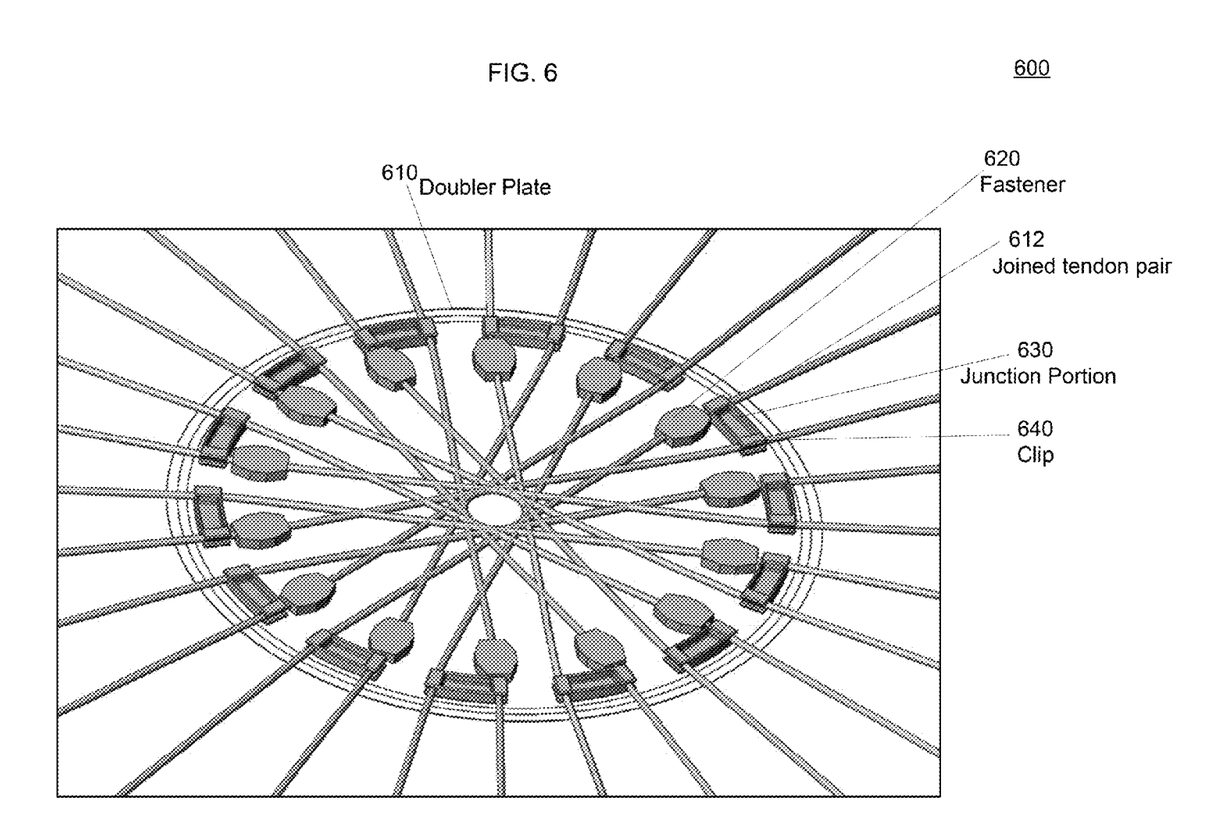
FIG. 6 is yet another example of a top cap assembly in accordance with aspects of the present disclosure.

FIG. 6 is yet another example of a top cap assembly 600. In this example, the top cap assembly 600 is configured similarly to top cap assembly 300 of FIG. 3 and top cap assembly 500 of FIG. 5. For example, the top cap assembly 600 includes a doubler plate 610 and a plurality of joined tendon pairs, such as joined tendon pair 612, that each have a first and second tendon member (not shown) and a plurality of fasteners, such as fastener 620 that may be same as fastener 320 of FIG. 3, for securing together the first and second tendon members of each tendon pair. Here, the top cap assembly 600 also includes a number of junction portions 630 disposed on the plate 510. As noted in FIG. 5, the junction portions are configured to provide a location on the doubler plate 610 that the first and second tendon members of a given tendon pair can meet in order to be joined together.

In some embodiments, the junction portions 630 may be further configured to keep the joined tendon pairs of the plurality of tendons spaced apart by a substantially uniform distance. For example, the junction portions 630 may be uniformly spaced apart along a circumference of the doubler plate 610. In that regard, this spacing is important because it partially sets the shape of the balloon lobes. The spacing distance between each junction portion may depend upon a diameter of the plate 610 so that entirety of the junction portions 630 can be sufficiently spaced apart.

Figure 7A:
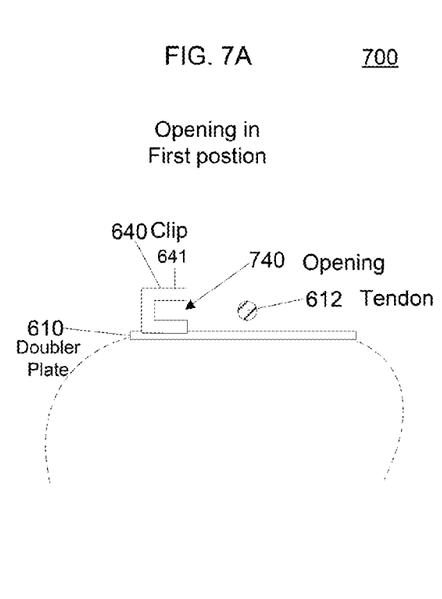
FIGS. 7A-7C are examples of a clip in accordance with aspects of the present disclosure.
Figure 7B:
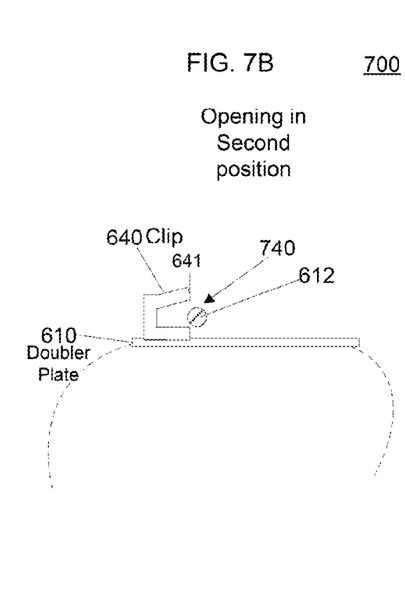
Figure 7C:
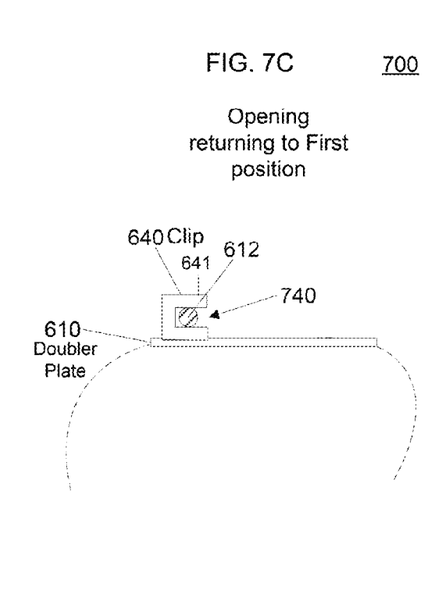

To help secure the joined tendon pairs in place at the junction portion, each point may include one or more clips. These clips may be used to hold the joined tendon pairs at the junction portions in order to avoid some amount of slippage by the tendon pairs. Aspects of these clips are further described below with respect to FIG. 7.

Turning to FIGS. 7A-C, an example of a clip 640, such as the clip 640 used in top cap assembly 600, is shown. In this example, the clip 640 includes an opening 740 for holding onto tendon 612. A portion of the clip 730 may be attached to the doubler plate 630. For example, here, a portion of clip 640 is shown attached to a surface of the doubler plate 610.

In FIG. 7A, the opening 740 of clip 640 is shown at a first position. For example, this may be an initial position of the clip 640 as it is arranged at a particular junction portion of the doubler plate 630. In this regard, tendon 612 may be positioned at the junction portion associated with the clip 640. In FIG. 7B, the opening 740 may move from a first position to a second position in order to receive a portion of the tendon 612. For example, the opening 740 of clip 640 may be widened by pulling on an upper portion 641 of the clip 640. At this point, the tendon 612 may be placed through the opening 740. As shown in FIG. 7C, when the opening 740 returns to the first position, the clip 640 may then hold onto the tendon 612. Because of this, the clip 640 may be conducted from a material such as a lightweight metal, plastic or another type of resilient material that can slightly flex when pull on with sufficient force and returns to an original position after manipulation.

Figure 8:
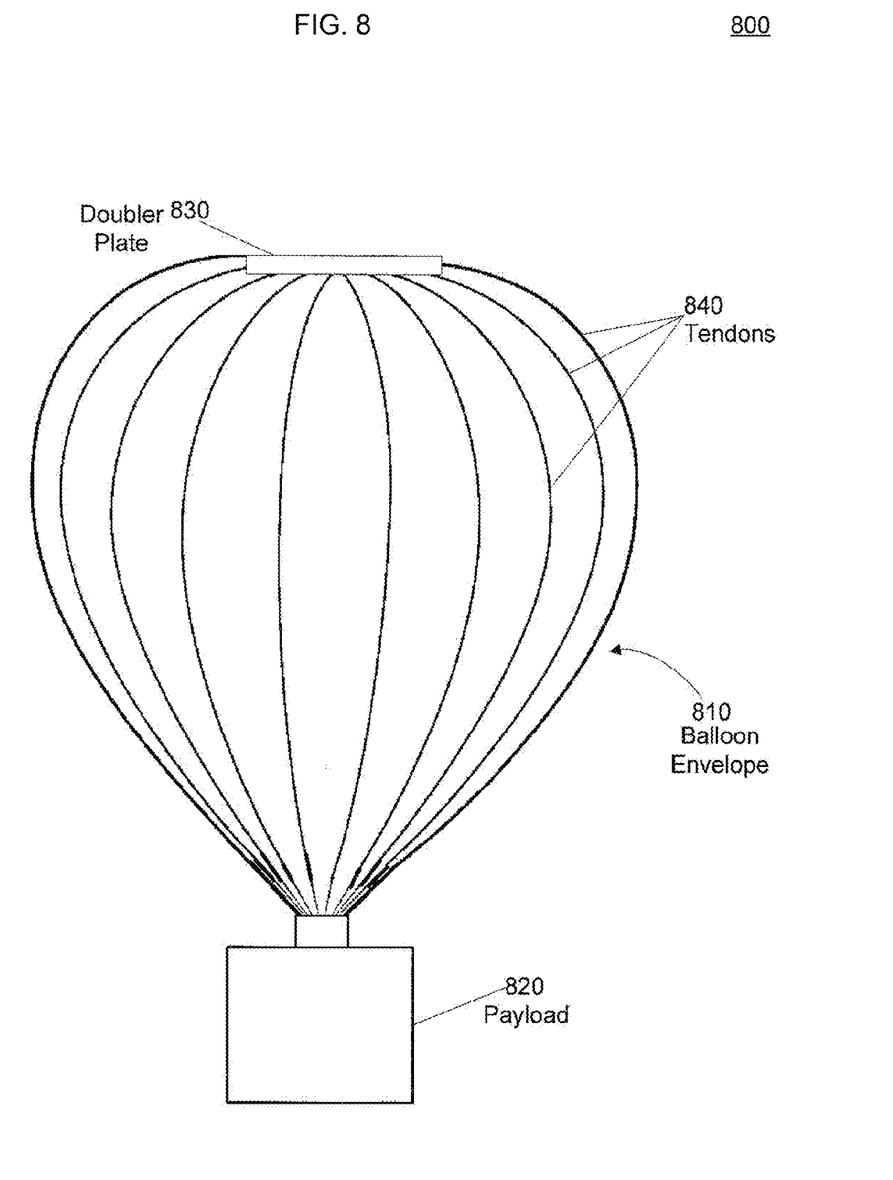
FIG. 8 is another example of a balloon in accordance with aspects of the present disclosure.

FIG. 8 is another example of a balloon 800, which includes a top cap assembly 830 corresponding to top cap assemblies 300, 500 or 600. As discussed above, the top cap assembly 830 serves as a mounting system for tendons 840. In this example, after the tendons 840 have been mounted over the top cap assembly 830, balloon envelope 810 is then filled. For example, in FIG. 8, the balloon envelope 810 is shown filled with lift gas. Then, payload 820 may be attached and thereafter the balloon 800 may be released into the air.

The above-described aspects of the present disclosure may be advantageous for providing a lightweight and low-cost technique for mounting tendons to a balloon structure that has a balloon envelope. For example, by routing the tendons across a top cap assembly resting at an apex of the balloon envelope so that they can be attached to each other, it may be possible to reduce the size and thickness of the mounting system for the tendons. This may allow the tendons to be configured to support a load carried by the balloon envelope without the need for any attachments to the apex of the envelope itself. Moreover, the various components of the top cap assembly may be modified to further manage and facilitate mounting of tendons to the balloon.

Unless otherwise stated the foregoing alternative examples are not mutually exclusive. They may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of manufacturing a high-altitude balloon, the method comprising:
   positioning a plate at an apex of an exterior portion of the balloon envelope;
   laying a first tendon over and across a portion of the plate, the first tendon being configured to run along and support a first portion of the balloon envelope; and
   joining a second tendon and the first tendon by joining a second end of the second tendon to a first end of the first tendon at the plate, the second tendon configured to run along and support a second portion of the balloon envelope.

2. The method of claim 1, wherein joining the second tendon to the first tendon includes using a fastener to secure the second end of the second tendon to the first end of the first tendon.

3. The method of claim 2, wherein the fastener includes a threaded component.

4. The method of claim 2, wherein the first end of the first tendon and the second end of the second tendon each include an end portion having a loop and the fastener includes an attachment member that attaches the loop of the first tendon to the loop of the second tendon.

5. The method of claim 1, further comprising:
   laying a third tendon over and across a second portion of the plate, the third tendon being configured to support a third portion of the balloon envelope;
   joining a fourth tendon to the third tendon, the fourth tendon configured to support a second fourth of the balloon envelope.

6. The method of claim 1, wherein the plate includes a plurality of junction structures spaced around the periphery of the plate and joining the second tendon to the first tendon includes attaching a first end of the first tendon to with a second end of the second tendon at the junction portion.

7. The method of claim 6, wherein the joined first and second tendons form a first tendon pair, and the method further comprises attaching a second tendon pair to the plate such that the plurality of junction structures are configured to keep the first and second tendon pairs apart.

8. The method of claim 6, wherein each of the plurality of junctions includes a clip, and wherein the method further comprises using the clip to attach the joined first tendon and second tendon to a first junction structure of the plurality of junction structures.

9. The method of claim 8, wherein using the clip includes:
   moving the clip from a first position to a second position to enlarge an opening of the clip; and placing the joined first tendon and second tendon into the enlarged opening such that the clip returns to the first position and holds the joined first tendon and second tendon in the opening.

10. The method of claim 1, wherein the plate further comprises a plurality of junction structures spaced evenly around the periphery of the plate, the joined first and second tendons form a first tendon pair, and the method further comprises:
joining a plurality of tendons a plurality of tendon pairs;
attaching the first tendon pair and each of the plurality of tendon pairs to a respective one of the plurality of junction structures to form lobes of the balloon envelope.

11. The method of claim 1, wherein the plate further comprises a spacer portion which projects outwardly from a surface of the plate, and laying the first tendon includes laying the first tendon around the spacer portion.

12. The method of claim 11, wherein the spacer portion is arranged at a central portion of the plate.

13. The method of claim 12, wherein the first and second tendons form a first tendon pair, and the method further comprises attaching a second tendon pair to the plate such that the spacer portion prevents the first and second tendon pairs from stacking up at the central portion.

14. The method of claim 1, further comprising:
after joining the second tendon to the first tendon, filling the balloon envelope with lift gas; and
releasing the balloon into the air.

15. The method of claim 1, further comprising laying the second tendon across at least a second portion of the plate such that the second portion of the plate is a lesser distance than the portion of the plate.

16. The method of claim 1, wherein the laying the first tendon includes placing the first tendon such that the first tendon extends across an outer edge of the plate at least twice.

17. The method of claim 1, wherein a length of the first tendon is greater than a length of the second tendon.

18. A method of manufacturing a high-altitude balloon, the method comprising:
positioning a plate at an apex of an exterior portion of the balloon envelope;
laying a first tendon over and across a portion of the plate, the first tendon running along and supporting a first portion of the balloon envelope; and
joining a second tendon to the first tendon at the plate, the second tendon running along and supporting a second portion of the balloon envelope.

19. The method of claim 18, wherein joining the second tendon to the first tendon includes using a fastener to secure the second tendon to the first tendon.

20. The method of claim 18, wherein the first tendon and the second tendon each include an end portion having a loop and the fastener includes an attachment member that attaches the loop of the first tendon to the loop of the second tendon.

\* \* \* \* \*